Aug. 18, 1970   MASAO ANDO   3,524,966
HEAT-GENERATING PIPE UTILIZING SKIN EFFECT OF A.C. HAVING
IMPROVED INSULATION IN CONDUCTOR LINE
Filed March 28, 1968

INVENTOR
MASAO ANDO

BY Craig & Antonelli

ATTORNEYS

United States Patent Office 3,524,966
Patented Aug. 18, 1970

3,524,966
HEAT-GENERATING PIPE UTILIZING SKIN EFFECT OF A.C. HAVING IMPROVED INSULATION IN CONDUCTOR LINE
Masao Ando, Kanagawaken, Japan, assignor to Chisso Corporation, Osaka, Japan
Filed Mar. 28, 1968, Ser. No. 716,714
Claims priority, application Japan, Mar. 30, 1967, 42/20,242
Int. Cl. H05b 3/00
U.S. Cl. 219—300       3 Claims

ABSTRACT OF THE DISCLOSURE

Heat generating pipe utilizing the skin effect of A.C. which is supported on a liquid transporting pipe in substantially axially parallel relation with said transportation pipe so as to conduct heat generated in said heat-generating pipe to the liquid in said transporting pipe which comprises at least one pipe of ferromagnetic material and an inner electric conductor line connected to a source of A.C. supply, supported within said heat-generating pipe in its longitudinal direction in electrically insulated relation from the inner wall portion of said heat-generating pipe, electrically connected at the end thereof remote from the A.C. supply source, in such a way that alternating current from the supply source flows through said electric conductor line, reaches said remote end of said heat-generating pipe and returns to the source through the inner wall portion of said heat-generating pipe, whereby said heat-generating pipe is heated by the skin effect of the alternating current flow through the inner wall portion thereof and the outer surface portion of said heat-generating pipe receives solely the heat so generated without any electric current flow therethrough, the insulation grade of said conductor line being characterized by stepwise reduction from the A.C. supply source to the point connected to the end of said heat-generating pipe.

BACKGROUND OF THE INVENTION

Field of art

This invention relates to a heat-generating pipe. More particularly, it relates to a heat-generating pipe which generates heat by skin effect of A.C. and supports therein a conductor line having a stepwise grade of insulation.

Prior art

With regard to a method for heating a liquid in a transporting pipe line and maintaining it at an elevated temperature, there is a disclosure of the present inventor in the specification of Japanese Pat. No. 460,224 (Japanese patent publication No. 12,128/1965, U.S. Pat. 3,293,407).

At first, the principle of said heat-generating pipe will be described with reference to a heat-generating pipe 1 illustrated in the appended drawing, FIG. 1. 1 is a pipe of ferromagnetic material and 2–3–4 is a conductor, e.g. an insulated electric wire, installed coaxially between both the ends of the pipe in electrically insulated relation from the pipe 1, one end of which is connected to an A.C. supply source 5 and the other end of which is connected to a terminal 11 of the pipe. When an electric potential of alternating current is supplied from the A.C. supply source 5 to the circuit consisting of the conductor 2–3–4 and the pipe 1, the current flowing between the terminals 11 and 12 of the pipe 1 appears only at the skin part of the inner wall portion of the pipe 1 because of skin effect.

The region through which current flows is called a penetration depth. Let the penetration depth be S (cm.), the inner diameter of the pipe be d (cm.) and if $d \gg S$, S can be expressed approximately by a formula of:

$$S = 5030\sqrt{\rho/\mu f} \tag{1}$$

in which $\rho$ is the specific resistance of the pipe material used ($\Omega$ cm.), $\mu$ is the magnetic permeability and $f$ is the frequency (cycles/sec.) of the A.C. Further, if there is a relation between thickness of the pipe $t$ (cm.), penetration depth S (cm.) and length $l$ (cm.), $$t > 2S \text{ and } l \geq D \tag{2}$$

the current concentrates in the skin part of the inner wall portion of the pipe 1 and therefore current does not appear in the outer surface zone of the heat-generating pipe in the circuit. Thus, Joule's heat is generated in the skin part of the inner wall portion of the pipe 1 by the concentrated current and transmitted to the outside of the pipe through the pipe wall and can be utilized in heating various objects.

When a steel pipe is used as the above-mentioned pipe of ferromagnetic material and a commercially available cycle voltage of 50 or 60 c.p.s. is used, the value of S calculated from the above-mentioned formula becomes approximately 0.1 cm. Since the thickness of the pipe $t$ of 0.2 cm. will be sufficient to satisfy the above-mentioned condition, there is no need of selecting a special pipe material or a special frequency of A.C. FIG. 2 shows a cross-sectional view of such a heat-generating pipe installed together with a liquid transporting pipe line to be heated therewith. 15 is a liquid transporting pipe and there is fixed a heat-generating pipe 1 over the entire length of the pipe line in substantially axially parallel relation therewith. It is preferable to take a proper measure, e.g. by welding, in order to ensure good heat-conduction between the pipes 1 and 15.

However, the cost of insulating material occupies a considerable part of the total construction cost of the above-mentioned heat-generating pipe. Generally speaking, the voltage applied to a heat-generating pipe for the purpose of heating a liquid in a pipe line is in the range of 200 to 600 volts in case of commercial frequency. Accordingly, when an electric supply source is provided only at one end of a long pipe line as in case of a pipe line e.g. of 40 km. in length used in transporting a highly viscous crude oil obtained from an oil well in the sea, the insulating material of the conductor line installed in the inside of a heat-generating pipe must endure a voltage as high as 8 to 24 kilovolt. If a customary insulated cable for high voltage use is employed in such a case, the cost of insulating material alone occupies more than 50% of the installation cost of a heat-generating pipe. It is really expensive. Accordingly, it has been desired to reduce the cost of insulating material of such a heat-generating pipe as much as possible.

It is an object of the present invention to reduce the cost of insulating material of the above-mentioned heat-generating pipe which utilizes skin effect of A.C. as much as possible particularly in case where such a heat-generating pipe is used to heat a liquid in a long distance pipe line.

SUMMARY OF THE INVENTION

Heat generating pipe utilizing the skin effect of A.C. which is supported on a liquid transporting pipe in substantially axially parallel relation with said transportation pipe so as to conduct heat generated in said heat-generating pipe to the liquid in said transporting pipe which comprises at least one pipe of ferromagnetic material and an inner electric conductor line connected to a source of A.C. supply, supported within said heat-generating pipe in its longitudinal direction in electrically insulated relation from the inner wall portion of said heat-generating pipe, electrically connected at the end thereof remote from the A.C. supply source, in such a way that alternating current from the supply source flows through said electric conductor line, reaches said remote end of said heat-generating pipe and returns to the source through the inner wall portion of said heat-generating pipe, whereby said heat-generating pipe is heated by the skin effect of the alternating current flow through the inner wall portion thereof and the outer surface portion of said heat-generating pipe receives solely the heat so generated without any electric current flow therethrough, the insulation grade of said conductor line being characterized by stepwise reduction from the A.C. supply source to the point connected with the end of said heat-generating pipe.

DESCRIPTION OF THE INVENTION

Figure 1:
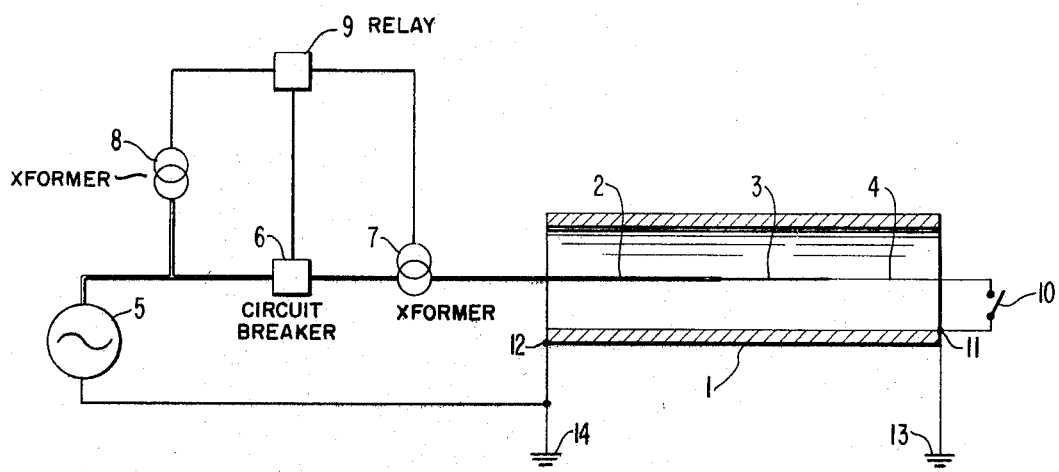
FIG. 1 is a circuit diagram in which the heat-generating pipe of the present invention is used.

The heat-generating pipe will be more fully described with reference to the accompanying drawing. FIG. 1 is a circuit diagram showing one embodiment of the present invention. Both terminals 11 and 12 of a heat-generating pipe 1 are connected to ground, respectively at 13 and 14 and the earth currents are almost zero under the conditions of the Formulae 1 and 2. If the presence of the connection to ground and the like are taken into consideration, the grade of insulation of a conductor 2–3–4 in these circuits can be gradually lowered from conductor portions 2 to 3. However, if the terminal part 10 of the conductor is opened by some reason or other or such is of necessity required, a high total electric potential is applied from a supply source 5 to the parts 3 and 4, which have a low insulation grade. Accordingly, it is necessary to take some measures to prevent the breakdown of insulation. Further it is to be noted that there is a specification provided for general insulated wire with respect to not only actually used potential but also test potential. For example, electric wire insulated with polyvinyl chloride must endure, 1500–3500 volts of A.C. in case of 600 volt wire, 8–9 kilovolts in case of 3 kilovolt wire, and 18 kilovolts in case of 6 kilovolt wire for at least 1 to 10 minutes, though this relation varies a little depending upon thickness. Accordingly, when a stepwise insulated wire 2–3–4, which has an insulation grade stepwise lowered from the side of the supply source, is installed, and if even the part 4 having a lowest grade of insulation can endure a test potential which is higher than a source potential i.e. circuit potential, it is possible to prevent sufficiently the break of insulation so long as it is for a short time, i.e. within one minute. If an arrangement for controlling a circuit breaker 6, including a current transformer 7 and a relay 9 in the circuit of the supply source side and for checking the presence or absence of electric current at the time of point opening of 10, is provided to open simultaneously the circuit breaker 6 within one minute by the relay 9, the above-mentioned object can be attained. 8 is a potential transformer used for various instruments, attached to the relay 9.

Figure 2:
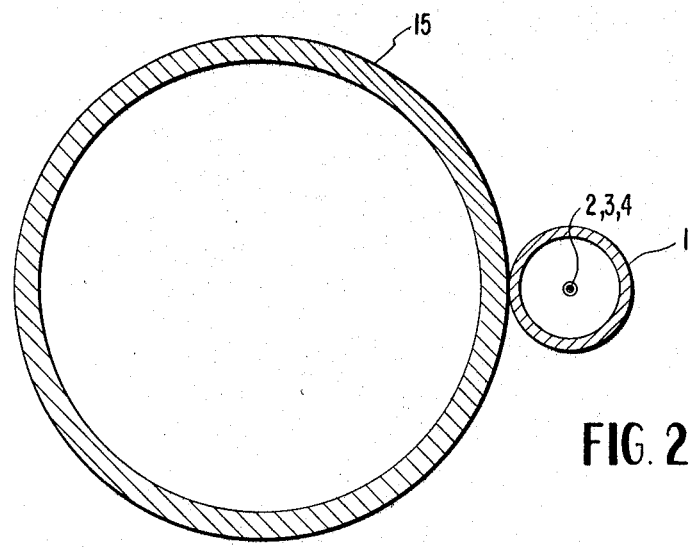
FIG. 2 is a schematic cross-sectional view of the heat-generating pipe which utilizes skin effect of A.C. and is installed together with a pipe line carrying a liquid which is to be heated.

FIG. 2 shows one example of such a heat-generating pipe installed with a pipe line. 15 is a liquid transporting pipe and numercials 1, 2, 3 and 4 correspond to the same numericals in FIG. 1. The heat-generating pipe is fixed to the outer circumference of the liquid transporting pipe 15 over its entire length in axially parallel relation. It is desirable to adopt some measure to increase heat conduction from the heat-generating pipe to the liquid transporting pipe by welding or some other means.

When the heat-generating pipe of the present invention is employed in the above-mentioned 40 km. pipe line from an oil well in the sea, it is assumed that a circuit potential is 8 kilovolts and a cross-sectional area (thickness) of the insulated wire is 100 mm.². In this case, 16 km. of 10 kilovolt wire (4.15 $/m.) for conductor part numerical 2, 12 km. of 6 kilovolt wire (2.35 $/m.) for the conductor part 3, and 12 km. of 3 kilovolt wire (2.08 $/m.) for the conductor part 4 can be used. If the prices of each conductor portion per 1 m. are estimated as indicated in the parentheses, a reduction of cost of about $47,000 can be realized when compared with the case where 10 kilovolt wire is used in the entire length. Since the 3 kilovolt wire withstands a test potential of 8 to 9 kilovolts, there will be no harmful effect in the entire length of the insulated wire so long as the circuit breaker 6 is opened within one minute after the opening of the current at 10.

Further, it is very effective to fill the pipe 1 with a heat-conductive fluid in the clearance part between the heat-generating pipe and the conductor line of the present invention, because an allowable current for an insulated conductor line accommodated in the inside of a heat-generating pipe is dependent upon an allowable temperature for the insulating material used in the conductor line, the temperature of the insulating material is reduced with the increase of the heat conductivity of the material existing in the clearance part of the pipe and the filling of heat-conductive fluid increases the allowable current for the conductor line. As heat-conductive liquid useful for the above-mentioned purpose, water, or an aqueous solution of a salt such as seat water is preferred but oils, fats, petroleum oils, alcohols, aqueous solutions of the foregoing members are also effective. When an insulated conductor line is an insulated cable for high voltage use, the field intensity around the surface of the insulated material can be made uniform and hence the durability of the insulating material can be improved by selecting a relatively electrically-conductive material from among heat-conductive liquids useful in filling the clearance part of the pipe.

What is claimed is:

1. A very long heat-generating pipe utilizing the skin effect of A.C. which comprises at least one ferromagnetic pipe having a thickness greater than the penetration depth of alternating current through the inner wall portion thereof, and an insulated electrical conductor line covered by a layer of solid electrical insulation material and inserted within and passing coaxially through the inside of said ferromagnetic pipe; a source of A.C. supply connected to one end of the conductor line which is located adjacent to one end of the ferromagnetic pipe and the other end of the conductor line being electrically connected to the end of the ferromagnetic pipe remote from the A.C. supply source, said one end of the ferromagnetic pipe near to the A.C. supply source being connected to the A.C. supply source, thereby forming a circuit such that alternating current from the supply source flows through said insulated electrical conductor line, reaches said end of the ferromagnetic pipe remote from the A.C. supply source and returns to the source through the inner wall portion of the ferromagnetic pipe, whereby the ferromagnetic pipe is heated by the skin effect of the alternating current flow through the inner wall portion thereof and the outer surface portion of the ferromagnetic pipe receives solely the heat so generated without any electrical current flow therethrough, wherein the grade of said layer of solid electrical insulation material is stepwise reduced from the end of the conductor line near to the A.C. supply source to the other end remote from the source, and further including circuit control means for switching the A.C. supply source off in the event the conductor line inside the ferromagnetic pipe is disconnected.

2. A heat-generating pipe according to claim 1, wherein said circuit control means includes a circuit breaker connected between said A.C. supply source and said conductor line and actuating means responsive to the absence of electric current in said conductor line for actuating said circuit breaker to disconnect said A.C. supply source from said conductor line.

3. A heat-generating pipe according to claim 2, wherein said actuating means includes a current transformer connected in series with said conductor line and a relay responsive to an output from said transformer for disconnecting said circuit breaker from its normal connection with said A.C. supply source.

References Cited

UNITED STATES PATENTS

| | | | |
|---|---|---|---|
| 1,646,599 | 10/1927 | Schaefer | 219—278 |
| 3,254,320 | 5/1966 | Hill et al. | 338—241 |
| 3,293,407 | 12/1966 | Ando | 219—301 |
| 3,398,351 | 8/1968 | Kuntke | 321—11 |
| 3,410,977 | 11/1968 | Ando | 219—10.49 |

ANTHONY BARTIS, Primary Examiner

U.S. Cl. X.R.

174—110; 219—10.49, 519; 307—94